United States Patent

[11] 3,622,296

| | | |
|---|---|---|
| [72] | Inventor | Walter M. Buehl<br>Corning, N.Y. |
| [21] | Appl. No. | 575,603 |
| [22] | Filed | Aug. 29, 1966 |
| [45] | Patented | Nov. 23, 1971 |
| [73] | Assignee | Corning Glass Works<br>Corning, N.Y. |

[54] METHOD OF FINING GLASS
8 Claims, 1 Drawing Fig.

[52] U.S. Cl. ................................................. 65/32,
65/134, 65/135
[51] Int. Cl. ......................................... C03b 5/16,
C03b
[50] Field of Search .............................. 65/134, 32,
132, 135

[56] References Cited

UNITED STATES PATENTS

| 2,038,627 | 4/1936 | Badger .......................... | 65/32 |
| 2,331,052 | 10/1943 | Shadduck ..................... | 65/134 |
| 2,387,222 | 10/1945 | Wright .......................... | 65/32 |
| 2,612,726 | 10/1952 | Nordberg ...................... | 65/32 |
| 3,015,190 | 1/1902 | Arbeit .......................... | 65/178 X |

FOREIGN PATENTS

| 818,958 | 10/1957 | Great Britain ................. | 65/134 |
| 235,375 | 3/1960 | Australia ....................... | 65/134 |

*Primary Examiner*—Frank W. Miga
*Attorneys*—Clarence R. Patty, Jr. and Gerhard K. Adam

ABSTRACT: A method of fining glass melts by fusing a glass composition in an atmosphere in which helium is substantially absent, passing gaseous helium into the molten glass such that the helium diffuses through the glass and into the seeds whereby the seeds become expanded, and permitting the expanded seeds to rise through the molten glass and become eliminated at the surface.

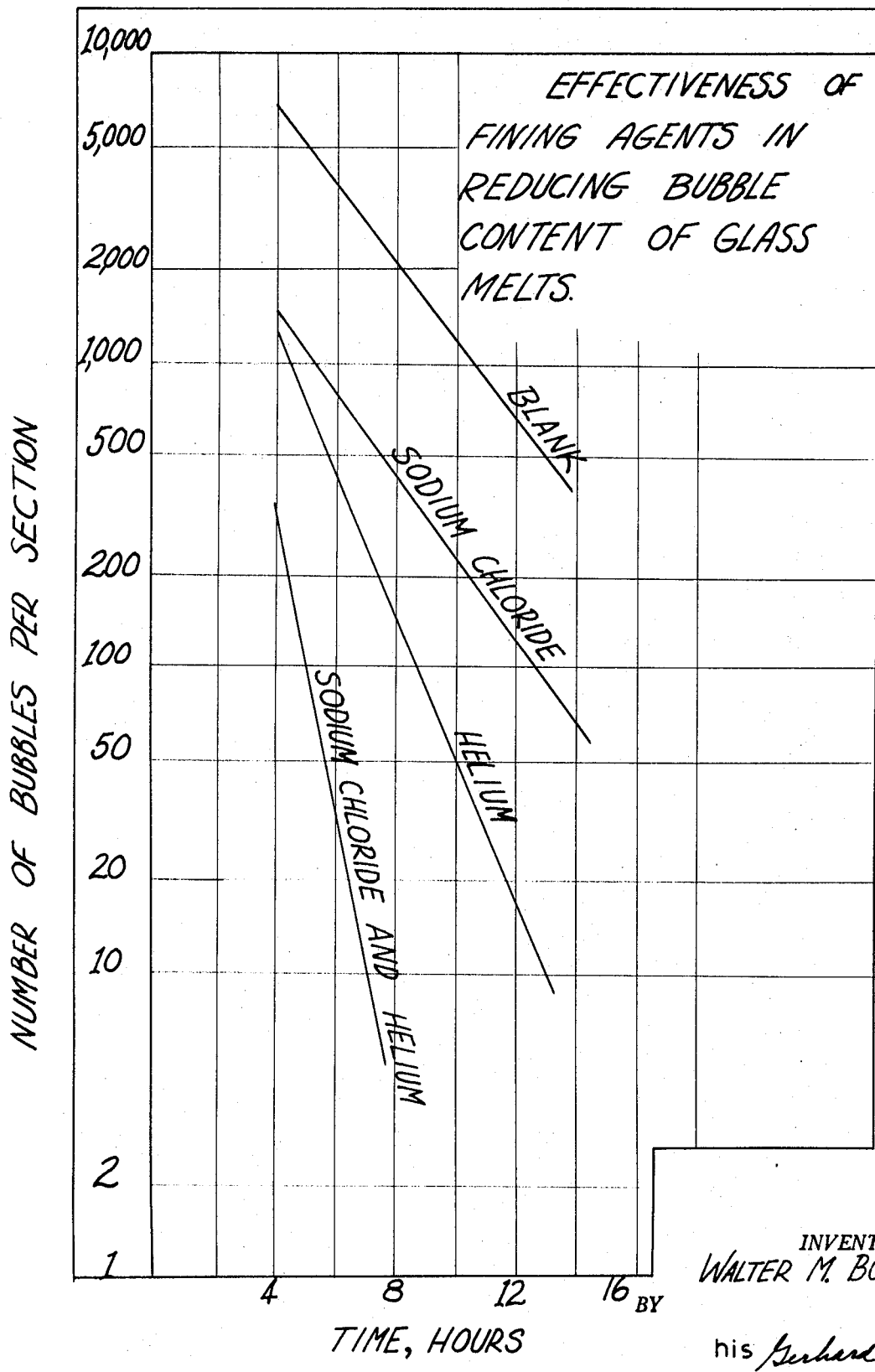

METHOD OF FINING GLASS

This invention relates to glass making and more particularly it relates to the fining of glass melts.

In the glass melting process, the raw batch materials are heated until the fluxes melt and dissolve the sand and other refractory materials. Usually, a large volume of gases is evolved as a result of the decomposition of the batch materials which together with the entrapped air form bubbles of various sizes in the molten glass. These bubbles, to a large extent, rise slowly through the melt and escape from the surface of the glass. However, gaseous inclusions, called seeds, sometimes remain within the molten mass and result in reducing the glass quality.

The process by which molten glass approaches freedom from undissolved gases is designated as fining. Previously, chemical fining agents, which function by releasing gases or volatilizing at high temperatures, were added in small amounts to the batch ingredients. Conventional fining agents include for example oxides, such as arsenic trioxide and antimony trioxide, and salts, such as sulfates, chlorides, sodium iodide, and sodium bromide. Unfortunately, the released gases have either oxidizing or mildly reducing properties and thus may tend to react chemically with the glass being prepared. Also residual amounts of the fining agent sometimes remain after fusion and impart undesirable color to the glass. In selection of a particular fining agent, it is necessary to take into consideration the decomposition or volatilization temperatures, since these will vary with each compound. Thus not only must the fining agent be tailored to the glass melt, but in some instances, especially in reduced glasses, fining has been difficult.

It is, therefore, an object of this invention to provide a method of fining glass melts with an agent that is chemically inert, readily diffuses from the glass melt and is effective over a wide temperature range.

In accordance with the present invention, I have discovered a method of fining glass melts by using the glass batch to form a molten mass containing gaseous inclusions, treating the molten mass with a helium atmosphere such that the helium passes into the inclusions and causes them to become expanded, and permitting the expanded inclusions to rise through the molten mass and escape at the surface.

The process for making glass by my invention may be considered in two steps. During the melting step, the raw batch materials are heated according to conventional procedures in an air containing atmosphere. This is followed by the fining step during which the fused mass is treated with a helium atmosphere which passes into the gaseous inclusions in the glass. It is initially necessary that melting be performed in an atmosphere in which helium is substantially absent so that a subsequent favorable helium diffusion gradient will exist. As the glass is fined, the individual bubbles are expanded by the diffusion of helium gas, adjacent bubbles coalesce into larger ones, and the relative buoyancy of the larger bubbles increases. These bubbles will then rise more rapidly and escape at the surface of the molten glass.

Helium is the only gas which I have found that can be used effectively for the fining of glass. It is chemically inert and as a result of its molecular size, helium relative to other gases is capable of rapidly diffusing through the glass lattice. Were diffusion the sole criteria, hydrogen which diffuses through glass at a somewhat slower rate, being diatomic and larger in molecular size, might be considered as a substitute. However, the great danger of explosion resulting when hydrogen is bubbled through glass melts at elevated temperatures makes its use impractical for this purpose.

While helium fining can be used broadly for most glasses, there are certain factors which influence its effectiveness. Generally, the rate of diffusion of helium through glass depends upon the chemical composition, on physical factors, the thickness of the glass, the pressure and temperature of the gas. Gaseous helium permeates more easily through quartz glass than borosilicate glass. The presence of alkali and alkaline earth metal oxides tend to diminish the permeability of the glass to helium.

The fining of glass melts by diffusion of gaseous helium is particularly suitable for the continuous melting furnace. Introduction of the helium is preferably made through bubblers located in the throat between the melting end and the refining end of the furnace. Other locations in the refining end are also suitable and the exact places for helium bubbling depend upon the design of the particular furnace. While the amount of helium gas used will vary depending on the size of the tank, the glass being fined, the operating temperatures and various other factors, usually for practical purposes one can calculate the preferred bubbling rate in terms of the cubic feet of gas per hour relative to the pull rate of pounds of glass per hour. Typically, the bubbling rate is in the range of 0.16 to 4.0 cubic feet of helium per hour for a pull rate of 700 pounds per hour. Under normal circumstances, when the bubbler is located at the throat between the melter and the finer, a rate of about 2 cubic feet per hour is adequate at the above pull rate.

In another aspect of the invention, helium can be used as a supplemental fining agent in addition to the standard chemical fining agent. Helium being inert, is chemically compatible with the conventional fining agents, be the latter oxidizing or reducing. When increasing the productivity of a glass melting tank by accelerating the pull rate, difficulties sometimes arise in that the number of seeds per cubic inch commences to climb. The seed count can then be substantially reduced by bubbling helium through the glass melt.

My invention is further illustrated by the following examples.

EXAMPLE I

Borosilicate glasses were melted in platinum crucibles placed in a platinum-wound, vertical, tube furnace having a gas tight top which was cooled by coils on the outside and fitted with a radiation shield. Several tubes passed through the top to permit purging with selected gases and one tube extended to just above the upper portion of the platinum crucible to receive the gases leaving the furnace.

Two batches were selected 321.8 identical compositions in weight percent as calculated on the oxide basis, however Batch A contained no chemical fining agent, while Batch B contained sodium chloride as a fining agent. The composition of the batches is shown in the table below.

TABLE I

| Ingredient | Batch A | Batch B |
|---|---|---|
| Dry Sand | 321.8 gm. | 321.8 gm. |
| Anhydrous Borax | 55.2 | 49.3 |
| Boric Acid | 26.8 | 33.9 |
| Alumina | 8.6 | 8.6 |
| NaCl | | 6.8 |

Platinum crucibles having a base diameter of 1.5 inches were filled with about 30 gms. of Batch A, uniformly mixed. These were inserted in the furnace at a temperature of 1450° C. in an air atmosphere for a specified period of time as indicated below. The samples were then removed and cooled. Similarly, crucibles containing 30 gms. of Batch B were inserted in the furnace at 1450° C. in an air atmosphere for specified periods of time, and also removed and cooled.

Thereafter, 30 gm. samples of Batch A were weighed into platinum crucibles and heated in the furnace at a temperature of 1450° C. in an air atmosphere. The furnace was purged with helium and the gas stream leaving the furnace was monitored by vaporphase chromatography to detect impurity content in the helium. After 30 minutes of purging the impurity level had dropped to about 0.2 percent. Heating in the helium atmosphere was continued for specified times and at the end of the run the glass was removed and cooled. Similarly, crucibles containing 30 gms. of Batch B were inserted in the furnace at 1450° C. in an air atmosphere for specified periods of time, and then removed and cooled.

Samples of the glasses made as described above were then annealed and uniform vertical sections were cut from the glass. These sections had the dimensions: length 2 cm., width 1.5 cm., and thickness 0.2 cm. to give representative sample having a total volume of 0.6 cu. cm. Standard techniques were used to determine the seed count per section. The glass batch, the fining agent, the conditions and the results are shown in the table below

TABLE II

| Fining agent | Batch | Atmosphere | Time, hours | Seed count |
|---|---|---|---|---|
| 1...... None...... | A | Air...... | 4 | 7,558 |
|  |  |  | 8 | 1,755 |
|  |  |  | 14 | 403 |
| 2...... NaCl | B | Air...... | 4 | 1,450 |
|  |  |  | 8 | 396 |
|  |  |  | 11 | 69 |
| 3...... Helium...... | A | (Air-1 hr)+He...... | 3 | 1,582 |
|  |  |  | 6.75 | 23 |
|  |  |  | 15.5 | 5 |
| 4...... He+NaCl | B | (Air-1 hr) plus He... | 2.5 | 359 |
|  |  |  | 6.5 | 5 |

The drawing shows the effectiveness of the fining agents in reducing the bubble content of the glass melts. It was found that the curve of the number of bubbles per section relative to the fining time approached a straight line when plotted on a logarithmic scale. It may be concluded form the results of which are graphically illustrated in the drawing that the longer the heating time, the fewer the number of seeds; NaCl, which is the standard fining agent for this particular glass, is effective in reducing the seed count; helium fining is about as effective as NaCl in reducing seeds at the short time interval and given substantially better results than NaCl at the longer time intervals; and the combination of helium together with the chemical fining agent, NaCl, was far superior in reducing the seed count than either agent separately.

I claim:
1. A method of fining glass melts comprising:
   a. fusing a glass composition in a atmosphere in which helium is substantially absent;
   b. passing gaseous helium into the molten glass such that the helium diffuses through the glass and into the seeds whereby the seeds become expanded and;
   c. permitting the expanded seeds to rise through the molten glass and become eliminated at the surface.
2. The method of claim 1, wherein the glass is melted in a continuous glassmaking furnace.
3. The method of claim 2, wherein the helium is passed into the molten glass through means at the bottom of the throat of said furnace between the melting end and the refining end.
4. The method of claim 2, wherein the helium is passed into the molten glass through means in the refining end.
5. The method of claim 1, wherein helium is used as a supplemental fining agent.
6. In a method of making a glass by fusing the batch into a molten mass containing gaseous inclusions, the improvement comprising:
   a. treating said mass with gaseous helium such that the helium diffuses into said inclusions and causes them to become expanded, and
   b. permitting the expanded inclusions to rise through the molten mass and become eliminated at the surface
7. The method of claim 6, wherein the glass batch contains a chemical fining agent.
8. The method of claim 7, wherein said chemical fining agent is sodium chloride.

* * * * *